United States Patent Office 3,591,638

Patented July 6, 1971

3,591,638

PROCESS FOR N-METHYLATING NITROANILINES AND COMPOUNDS PREPARED THEREBY

Alexander Halasz, Norwalk, Conn., assignor to Clairol Incorporated, New York, N.Y.

No Drawing. Filed May 13, 1968, Ser. No. 728,786
Int. Cl. C07c 9/44, 85/10, 87/52
U.S. Cl. 260—574 12 Claims

ABSTRACT OF THE DISCLOSURE

N-methylating nitroanilines by reacting nitroanilines with a mixture containing formaldehyde or paraformaldehyde and sulfuric acid; compounds prepared by this process being useful as hair dyes.

This invention relates to a process for N-methylating nitroanilines, and more particularly to a process for monomethylating the primary amine functional groups (—$NH_2$) of substituted and unsubstituted nitroanilines. The products made by the process of the present invention are useful as dyes and especially as hair dyes for dyeing human hair.

The N-methylnitroanilines wherein one amino hydrogen is replaced by a single methyl group in one or more amino groups form a group of compounds which are useful in dyeing hair. However, the preparation of compounds of this character, in accordance with prior art methods, present a number of problems. The chief problem is that the prior art methylation procedures have a great tendency to replace both amino hydrogens on the same nitrogen atom, and thus produce products which are to a large extent the tertiary amine products.

It has now been found that the monomethylation of the primary amino groups of nitroanilines can be accomplished in good yield by using a mixture of sulfuric acid with formaldehyde, or paraformaldehyde as the methylating agent.

It is accordingly an object of the present invention to provide a process for the N-monomethylation of nitroanilines containing free primary amino groups in which no more than one amine hydrogen on the same amino nitrogen is replaced by a methyl group.

It is a further object of the present invention to provide a process for the N-monomethylation of nitrophenylenediamines containing at least one free primary amino group in which no more than one amine hydrogen on the same amino nitrogen is replaced by a methyl group.

It is also an object of the present invention to provide certain novel nitro-p-phenylenediamine compounds which are useful in dyeing hair and certain novel compositions containing the same.

Other and more detailed objects of this invention will be apparent from the following description and claims.

The use of a combination of formaldehyde and formic acid to methylate amines is known in the prior art. In this connection attention is directed to the following:

(1) The Action of Formaldehyde on Amines and Amino Acids, H. T. Clarke, H. B. Gillespie and S. L. Weisshauss, J. Am. Chem. Soc. 55 (1933) 4571.

(2) Methylation of Aromatic Amines by the Wallach Method, Walter L. Borkowsky and E. C. Wagner, J. Org. Chem. 1952, p. 1128.

(3) Methylation of Amines with Formaldehyde, Organic Reactions, vol. V, p. 307 (by Maurice L. Moore).

These processes, however, are not concerned with the monomethylation of nitroanilines.

German Pats. 376,013; 491,856; and 503,113 disclose the methylation of certain phenyl amines using formaldehyde in an acid medium in the presence of zinc. These references are also not concerned with nitroanilines, and the processes disclosed therein are not applicable to the preparation of the products of interest in the present invention. The presence of zinc in the reaction mixture of these German patents would result in the reduction of the nitro groups of the nitroanilines used as starting materials in the present invention, and would defeat the purpose of the present invention, i.e., to prepare methylated nitroanilines.

German Pat. 156,056 shows the monomethylation of α-aminoanthraquinones using a combination of formaldehyde and sulfuric acid. It also refers to German Pat. 80,520 showing a similar reaction for aliphatic diamines in which, however, the yields are very poor. The α-aminoanthraquinones are, obviously, far removed chemically from the nitroanilines employed in the process of this invention. The α-aminoanthraquinones are very weak bases and are not comparable to the nitroanilines. The former are so weak probably because of hydrogen-bonding of the amino group to the quinone carbonyl, that they do not even form salts with acids which are stable in aqueous medium. This is quite different from the amines of the benzene series. Another difference is that the α-aminoanthraquinones exchange their α-amino group with relative ease when heated with a second amine at elevated temperatures. Consequently, this teaching with regard to the α-aminoanthraquinones would not suggest itself in a process which employs the amines of the benzene series.

The process of the present invention is applicable to a variety of nitroanilines. This term is used herein in its generic sense to include the simple and unsubstituted nitroanilines, such as ortho, meta and paranitroaniline, and the more complicated nitroanilines which carry other substituents in various places on the benzene ring. By way of example the nitroanilines may carry one or more of such substituents as nitro, alkoxy, halogen, alkyl, amino, alkylamino, dialkylamino, acylamino, and carbalkoxyamino, etc.

Illustratively, nitroanilines which may be used in accordance with the present invention may be described by the formula:

(I)

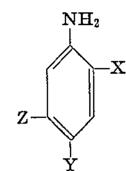

wherein:

X=H or $NO_2$,
Y=H, $NO_2$, alkoxy, alkyl, halogen, $NH_2$, NHalkyl, $N(alkyl)_2$, NHacyl or NHCOOalkyl,
Z=H, $NO_2$, alkoxy, halogen or alkyl, at least one of X, Y and Z being $NO_2$.

The process of the present invention is particularly suitable to the employment of nitroparaphenylenediamines as starting materials. Any of a variety of compounds falling within this class may be used. By way of example of compounds of this class there may be mentioned compounds of formula:

(II)

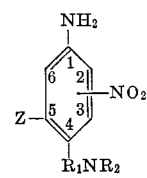

wherein:

$R_1$=H or alkyl, $R_2$=H, alkyl, acyl or carbalkoxy, i.e.

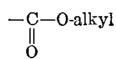

Z=H, alkoxy, halogen or alkyl;

the $NO_2$ group being in position 2 or 3 on the benzene ring.

The alkyl moieties of the radicals described in the above Formulas I and II, e.g., alkyl, alkoxy, carbalkoxy,

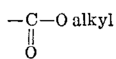

—NHalkyl, —N(alkyl)$_2$ or —NHCOOalkyl can vary. In general, however, these will be lower alkyl groups having from 1 to about 6 carbon atoms. Thus, they may be such alkyl moieties or methyl, ethyl, n-propyl, iso-propyl, n-butyl, n-pentyl, hexyl, etc.

The acyl moiety in the acyl radical per se or the radical —NHacyl of the above formulas may also vary. They may be aliphatic or aromatic radicals, e.g., acetyl, propionyl, butyryl, hexanoyl, benzoyl, toluoyl (o, m, or p), dimethylbenzoyl, etc. Ordinarily, the acyl radical will be a carboxy acyl radical having up to about 8 carbon atoms.

When Y or Z is halogen in Formula I or II above, it may be any of the halogens including Cl, Br, I, F.

In carrying out the process of the present invention, the nitroaniline is preferably dissolved in the sulfuric acid. The formaldehyde or paraformaldehyde is then added to the sulfuric acid solution, and the mixture maintained at an elevated temperature until the reaction is completed. The reaction can be carried out in the temperature range of about 40° C. to 120° C. The preferred temperature range, however, is from about 50° C.–100° C. The final product is then recovered using any suitable recovery technique, depending upon the particular final product.

The quantity of formaldehyde or paraformaldehyde used in the process of the present invention may vary somewhat depending upon the results desired. Generally, the molar ratio of formaldehyde or paraformaldehyde to the nitroaniline used will be in the range of from about 3 to 10 moles of the formaldehyde or paraformaldehyde to 1 mole of nitroaniline, and preferably in the range of about 3 to 5. Both anhydrous formaldehyde or paraformaldehyde may be used, or, if we prefer, aqueous formaldehyde (Formalin). However, the quantity of water introduced may not be more than 20% on the weight of the sulfuric acid, and preferably, the reaction medium should be as nearly as possible anhydrous. Similarly, the quantity of sulfuric acid employed in the reaction medium may also vary but will usually be in the range of molar ratio of about 5 to 20 moles of sulfuric acid to 1 mole of the nitroaniline and preferably in the ratio of 10 to 1.

Where more than one free primary amino group is present in the particular nitroaniline selected for reaction, one of the amino hydrogens of each of the amino nitrogens will be replaced with a methyl group. Thus, for example, when 2-nitro-p-phenylenediamine is used as the nitroaniline, the product recovered is $N^1,N^4$-dimethyl-2-nitro-p-phenylenediamine. Where it is desired to end up with a nitrophenylenediamine final product containing a free amino group in one of the positions, one of the amino groups is first protected before the methylation procedure. This can be done by acetylating one of the amino nitrogens or preparing the corresponding urethane or benzoyl derivative. After the methylation reaction, the acyl group or the carbalkoxy group may be hydrolyzed off leaving the free amino group.

Compounds prepared in accordance with the present invention can be employed to prepare basic, neutral or acidic dye compositions and may be used in conjunction with oxidation dyes. Furthermore, they may likewise be included in hair dyeing compositions which contain other direct dyeing dyes that also may or may not contain an oxidation dye. A variety of direct dyeing dyes are known in the prior art which are useful for this purpose. They include other nitro dyes, azo dyes, anthraquinone dyes, etc. By way of illustration, any of the nitro dyes disclosed in the following U.S. patents may be used in conjunction with the present nitro dyes: 2,750,326; 2,750.327; 3,088,-877; 3,088,878 and 3,088,978.

The pH of the dye compositions made in accordance with the invention can vary from about 2.5 to 11. In the acid range the pH of about 3.5 to 6 is suitable. It is preferred, however, that the compositions be in the alkaline range, and particularly at a pH of about 7.5 to 10.

Any selected water-dispersible, compatible, alkalizing agent (if it is desired to have the compositions in the alkaline range) can be used to give the desired pH. The quantity of the alkalizing agent employed can vary over a wide range depending on the dye, particular alkalizing agent employed and the desired pH. Illustratively, the alkalizing agent can vary from less than about 0.1% to about 10%, and preferably from about 0.25% to about 5% by weight of the compositions.

Water-soluble surface-active agents can also be utilized in formulating dyeing compositions of this invention. These can be anionic, non-ionic or cationic. The quantity of these materials contained in the composition can vary widely. Generally, however, it will constitute from about 0.25% to 15% by weight of the composition and preferably from about 0.25% to 10% by weight of the composition.

A thickening agent can also be incorporated in the present dyeing composition which may be one or several of those commonly used in hair dyeing, such as sodium alginate or gum arabic, or cellulose derivatives, such as methylcellulose, or the sodium salt of carboxymethylcellulose, or acrylic polymers, such as polyacrylic acid sodium salt, or inorganic thickeners, such as bentonite. The quantity of thickening agent can vary over a wide range, such as that of from about 0.1% to 20% and preferably from about 0.5% to 5% by weight.

The tinctorially effective quantities of dyes in the dye compositions of this invention can also vary over a wide range, such as that of about 0.01% to greater than about 5%, e.g., 10%, by weight of the composition, and preferably from about 0.01% to about 2% by weight. The water content of the composition is ordinarily the major constituent and can vary over a wide range depending in large measure on the quantity of other additives. Thus, the water content can be as little as 10%, and preferably from about 70% to 99%.

The dyeing compositions of this invention can be prepared by the conventional methods used in the hair dyeing art. Thus, they can be prepared by dissolving or suspending the dye in water in the desired concentration. Water miscible organic solvents can be employed to facilitate solution of the dye; in this event, the dye can be dissolved first in the solvent and then diluted with water. The dispersion of the various ingredients can also be facilitated by heating the composition at temperatures varying from 40° C. to 110° C., either before dilution with water or afterwards.

The dyeing compositions of this invention can be applied to hair by the conventional techniques used in the art. Illustratively, when applied to living hair on the human head, the compositions can be applied to the hair with a brush, sponge, or other means of contact, such as dipping until the hair is properly saturated with the composition.

The reaction time or time of contact of the dyeing composition with the hair is not critical and can vary over a wide range used in the hair dyeing art, such as periods of about 5 minutes to about 2 hours, and preferably from about 15 minutes to about 60 minutes. The dyeing temperature can vary over wide limits as is conventional in the art. Thus, the dyeing temperature can vary from about room temperature, e.g., about 20° C., to above about 60° C., and preferably from about 20° C. to about 45° C.

The following examples are further illustrative of the present invention. It should be understood however, that the invention is not limited thereto.

EXAMPLE 1

Methylation of 2-nitro-p-phenylenediamine

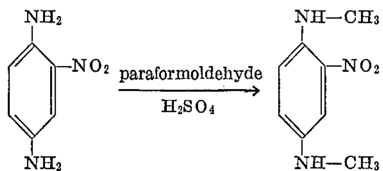

To 15.3 g. of 2-nitro-p-phenylenediamine, dissolved in 150 g. 96% $H_2SO_4$, was added 24 g. paraformaldehyde. The mixture was heated with stirring on the water bath for 20 minutes, after which the reaction mixture was poured over ice and made alkaline with ammonia. The product, which separated, was dissolved in 300 ml. acetone. The acetone solution was then clarified, after which there was added to it 10 ml. concentrated hydrochloric acid. The precipitated hydrochloride of the product was filtered off and washed on the filter with acetone and dried. The pure hydrochloride (M.P. 250°–251° C.) thus obtained was slurred in 300 ml. water and converted to the free base by addition of excess ammonia. After 15 minutes stirring, dark violet crystals were filtered off, washed with water and dried. 13 g. pure $N^1,N^4$-dimethyl-2-nitro-p-phenylene-diamine was obtained. The M.P. of 99° C.–100° C. of the pure product is identical the M.P. of $N^1,N^4$-dimethyl-2-nitro-p-phenylene-diamine. The infrared spectra of the respective compounds are also identical. The nitrogen analysis of each compound is also the same. This compound dyes gray and bleached hair a strong violet shade.

EXAMPLE 2

Methylation of o-nitroaniline

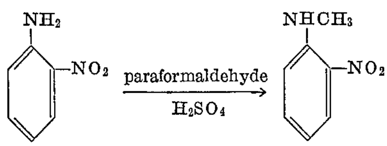

The process of Example 1 was followed, excepting that in place of 2-nitro-p-phenylenediamine, an equivalent amount of o-nitroaniline is employed. The product recovered is N-methyl-o-nitroaniline.

EXAMPLE 3

Methylation of m-nitroaniline

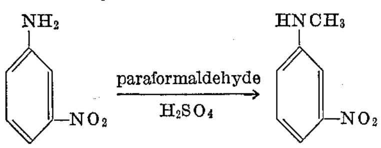

The process of Example 1 was followed, excepting that in place of 2-nitro-p-phenylenediamine, an equivalent amount of m-nitroaniline was employed. The product recovered is N-methyl-m-nitroaniline.

EXAMPLE 4

Methylation of p-nitroaniline

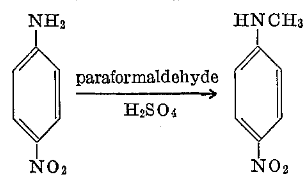

The process of Example 1 was followed, excepting that in place of 2-nitro-p-phenylenediamine, an equivalent amount of p-nitroaniline was employed. The product recovered is N-methyl-p-nitroaniline.

EXAMPLE 5

Methylaton of dinitroaniline

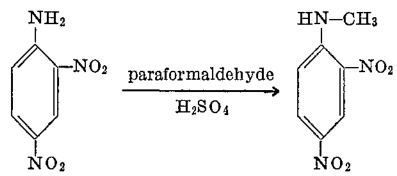

The process of Example 1 was followed, excepting that in place of 2-nitro-p-phenylenediamine, an equivalent amount of 2,4-dinitroaniline is utilized. The product recovered is N-methyl-2,4-dinitroaniline.

EXAMPLE 6

Methylation of 4-methoxy-2-nitroaniline

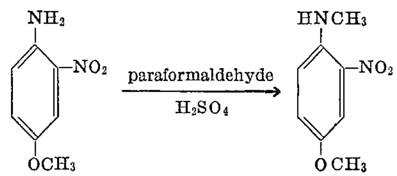

The process of Example 1 was followed, excepting that in place of 2-nitro-p-phenylenediamine, 4-methoxy-2-nitroaniline is utilized. The product recovered is N-methyl-4-methoxy-2-nitroaniline.

EXAMPLE 7

Methylation of $N^4$-benzoyl-2-nitro-p-phenylenediamine and preparation of $N^1$-methyl-2-nitro-p-phenylenediamine

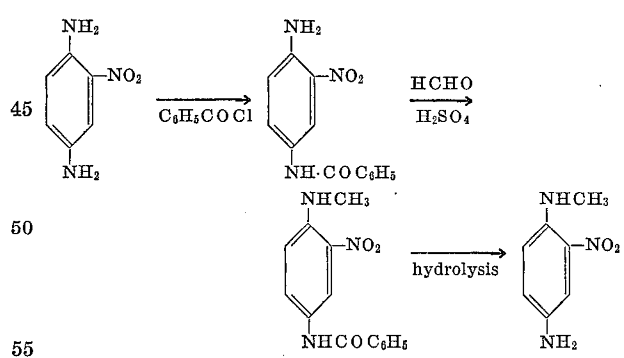

To 15.3 g. 2-nitro-p-phenylenediamine, 9 g. $NaHCO_3$ and 300 ml. acetone were added to 14 g. benzoyl chloride, and the mixture was heated at reflux for one hour. There is obtained a very pure $N^4$-benzoyl-2-nitro-p-phenylenediamine, M.P. 230° C.–234° C.

12.5 g. $N^4$-benzoyl-2-nitro-p-phenylenediamine was dissolved in 100 ml. conc. $H_2SO_4$ at room temperature with stirring. The solution was then heated to 50° C., and over a period of one hour, 30 ml. 37% aqueous formaldehyde was added dropwise. The mixture was maintained at 50–55° C. for an additional 4 hours, after which it was poured into ice water. The crystals of $N^1$-methyl-$N^4$-benzoyl-2-nitro-p-phenylenediamine which precipitated were orange and had a M.P. of 167–70° C. The crystals were hydrolyzed with 80 ml. 85% $H_2SO_4$ for 6 hours on a water bath. The mixture was then poured onto ice, made alkaline with ammonia, filtered and washed. There was obtained 4.4 g. of N-methyl-2-nitro-p-phenylenediamine, M.P. 107–108° C.

EXAMPLE 8

Methylation of $N^4$-acetyl-2-nitro-p-phenylenediamine and preparation of $N^1$-methyl-2-nitro-p-phenylenediamine

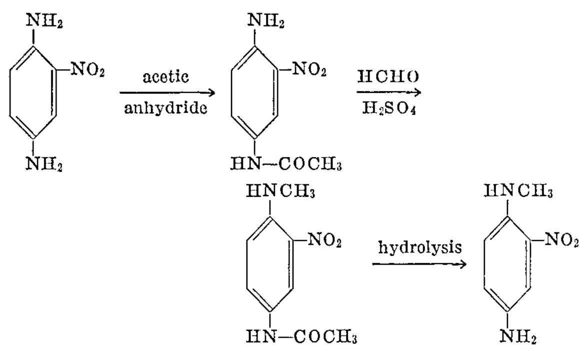

19.5 parts of $N^4$-acetyl-2-nitro-p-phenylenediamine (prepared by reacting 1 part acetic anhydride with 1 part 2-nitro-p-phenylenediamine) was dissolved in 100 parts of 96% $H_2SO_4$ at room temperature. The mixture is then heated to 50° C. on a water bath, and 50 parts 37% aqueous formaldehyde is added dropwise for one hour. Care was taken not to go beyond 55° C. After addition, the reaction mixture was maintained at 55° C. for 2 hours and then poured into ice water. The $N^1$-methyl-$N^4$-acetyl-2-nitro-p-phenylenediamine separates as crystals, M.P. at 147° C.–149° C. This was hydrolyzed with 80% $H_2SO_4$ at 95° C.–100° C. There was obtained 8.5 parts of $N^1$-methyl-2-nitro-p-phenylenediamine.

EXAMPLE 9

Methylation of the urethane of 2-nitro-p-phenylenediamine and preparation of $N^1$-methyl-2-nitro-p-phenylenediamine

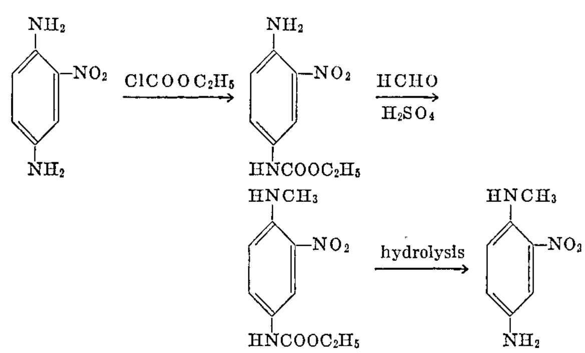

76.5 g. of 2-nitro-p-phenylenediamine, 45 g. sodium acetate and 500 ml. ethanol were heated at reflux and 56 g. ethyl chloroformate was dropped in the mass. After 1 hour, the reaction mixture was poured over ice water and filtered. There was obtained 88 g. of reaction product, which after recrystallization from water, had a M.P. of 129° C.–130° C.

11 g. of the urethane which was thus obtained and 100 g. $H_2SO_4$ was stirred until solution took place. Over a period of 1 hour, 35 ml. of a 37% formaldehyde solution was added dropwise to the mixture. The temperature was maintained at 50° C.–60° C., the mixture stirred at this temperature for an additional 4 hours and then poured into 600 ml. ice water. The product which separated was dissolved in acetone, filtered, and the acetone solution was evaporated. 12.5 g. of the urethane of N-methyl-2-nitro-p-phenylenediamine was obtained. This product was heated with 100 ml. 80% $H_2SO_4$ on a water bath for 12 hours, poured over ice and made alkaline with ammonia. The $N^1$-methyl-2-nitro-p-phenylenediamine which separated as crystals was filtered and dried. Yield: 7 g., M.P. 107° C.–108° C.

EXAMPLE 10

Methylation of $N^1$-isopropyl-2-nitro-p-phenylenediamine

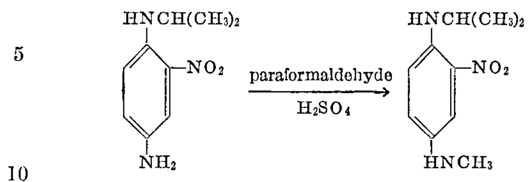

To 15 g. $N^1$-isopropyl-2-nitro-p-phenylenediamine was added 100 g. conc. $H_2SO_4$, and the mixture stirred and heated on a water bath until dissolution occurred. After the temperature reached 65° C., there was added at once 15 g. paraformaldehyde. The mixture was heated to 95° C. and kept at this temperature for 30 minutes, after which the reaction mixture was poured over ice and made alkaline with ammonia. The precipitate was filtered off and dissolved in 400 ml. acetone. The acetone solution was filtered again to separate salt or other impurities. To the acetone solution was added 20 ml. conc. HCl. The hydrochloride, which was formed, was filtered off and treated with aqueous ammonia to regenerate the free base. Yield was 7.5 g. The $N^1$-isopropyl-$N^4$-methyl-2-nitro-p-phenylenediamine was obtained, has a M.P. of 79° C.–81° C., and is a dark violet color. The nitrogen analysis corresponded to the formula:

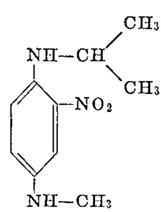

EXAMPLE 11

Methylation of 5-methoxy-2-nitro-p-phenylenediamine

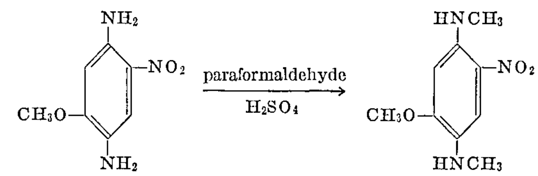

13. g. of 5-methoxy-2-nitro-p-phenylenediamine was dissolved by stirring in 100 ml. $H_2SO_4$ at 40° C. To this solution was added 15 g. paraformaldehyde, and the mixture heated at 100° C. for 15 minutes, after which the reaction mixture was poured over ice. After addition of ammonia, to make it alkaline, the mixture was filtered, and the filter cake washed, dried and recrystallized from benzene. There was obtained 3 g. pure $N^1$,$N^4$-dimethyl-5-methoxy-2-nitro-p-phenylenediamine as dark red crystals of M.P. 153° C.–156° C.

EXAMPLE 12

Methylation of 5-chloro-2-nitro-p-phenylenediamine

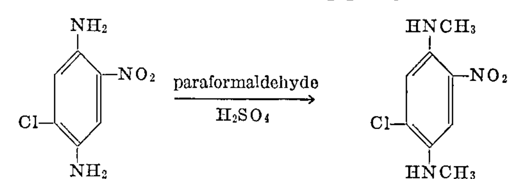

4 g. of 5-chloro-2-nitro-p-phenylenediamine was dissolved in 50 g. of $H_2SO_4$. The solution was heated with stirring, and at 60° C., there was added 6 g. paraformaldehyde. After heating at 95–100° C. on the water bath for 2 hours, the mixture was poured into ice water. The solution was made alkaline with ammonia and the dark crystals which separated out were filtered off, washed with water and recrystallized for ethanol. There was obtained 2 g. dark violet crystals, pure chromatographically, M.P.

170° C.–171° C. The analysis for Cl and N corresponded to $N^1,N^4$-dimethyl-2-nitro-5-chloro-p-phenylenediamine.

EXAMPLE 13

Methylation of 5-methyl-2-nitro-p-phenylenediamine

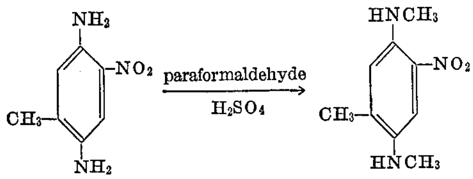

To 5 g. of 5-methyl-2-nitro-p-phenylenediamine dissolved in 50 ml. conc. $H_2SO_4$, was added 8 g. paraformaldehyde. The mixture was heated on the water bath for 5 hours and poured over ice. After stirring for some time, the product was filtered off, washed with water, dried and recrystallized for ethanol. The $N^1,N^4$-dimethyl-2-nitro-5-methyl-p-phenylenediamine was obtained as dark red crystals, melting at 144° C.–146° C.

EXAMPLE 13A

Monomethylation of 1-amino-3-nitro-4-fluorobenzene

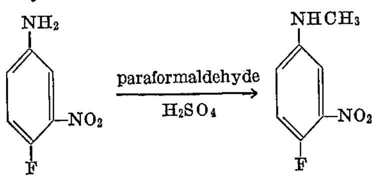

18.9 g. of 1-amino-3-nitro-4-fluorobenzene was dissolved in 150 g. concentrated $H_2SO_4$ at room temperature. To this solution was added 30 g. paraformaldehyde and the whole mixture heated on a water bath for 2 hours and 15 minutes. The reaction mixture was then poured on ice, neutralized with ammonia and the reaction product extracted with ethyl acetate. The ethyl acetate solution was added to charcoal and then filtered. The filtrate yielded 18.8 g. of 1-methylamino-3-nitro-4-fluorobenzene, M.P. 187–188° C.

EXAMPLE 13B

Monomethylation of 1-amino-2-nitro-4-methoxybenzene

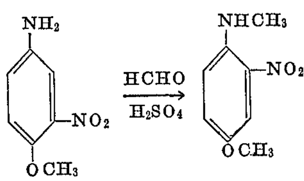

15 g. 1-amino-2-nitro-4-methoxybenzene was dissolved in 111 ml. 80% $H_2SO_4$ by stirring it ½ hour at 50° C. To this mixture 40 ml. formaldehyde was added and the whole reacted 90 minutes at 80° C. The solution was then cooled and filtered and to the solution was added water and ammonia. The precipitate formed was filtered off and recrystallized in ethyl alcohol. There was obtained a very pure 1-methylamino-2-nitro-4-methoxybenzene.

The following examples illustrate the use of compounds made by the process of this invention in dyeing hair.

EXAMPLE 14

Dyeing hair with $N^1,N^4$-dimethyl-2-nitro-p-phenylenediamine

One gram $N^1,N^4$-dimethyl-2-nitro-p-phenylenediamine was dissolved in a mixture of 20 ml. isopropanol, about 200 ml. of water, 2 g. of monoethanolamine, 1 g. of triethanolamine, 1 g. of polyacrylic acid and 1 g. of glycerol at 50° C. This composition was heated to about 35° C. to 37° C. and then applied to gray hair. After about 20 minutes, the hair was thoroughly rinsed and washed with soap and water. The hair was colored bluish violet by the composition, and the resulting shade was rubfast and not removable by washing with soap and water.

EXAMPLE 15

Dyeing hair with $N^1$-isopropyl-$N^4$-methyl-2-nitro-p-phenylenediamine

About 2 grams of $N^1$-isopropyl-$N^4$-methyl-2-nitro-p-phenylenediamine was dissolved in about 17 g. of isopropanol and then 200 g. of water was added with stirring to prepare a solution. To this solution there were added 2 grams of monoethanolamine, 1 gram of triethanolamine and about 3 g. of Carbopol 934 (a polycarboxylated vinyl resin, made by B. F. Goodrich & Co.). The mixture was thoroughly agitated. This composition was then poured into the hair at the temperature of about 30° C. and permitted to remain on the hair for 30 minutes, after which time it was washed out. The hair was dyed to a blue violet color.

EXAMPLE 16

Dyeing hair with $N^1,N^4$-dimethyl-2-nitro-5-chloro-p-phenylenediamine

A dyeing composition was prepared by dissolving 5 g. of $N^1,N^4$-dimethyl-2-nitro-5-chloro-p-phenylenediamine in 50 g. of ethanol at 50° C. The ethanol solution of the dye was then added with stirring to a mixture containing 500 g. of water, 10 g. of diethanolamine and 1 g. of agar agar as a thickener. The mixture was then heated to a temperature of about 30° C.–37° C. and applied to the hair by simply pouring the mixture over the hair. The dyeing mixture was left on the hair for 20 minutes and then was rinsed out with water. The hair was dyed dark violet color without scalp staining.

EXAMPLE 17

Dyeing hair with $N^1,N^4$-dimethyl-2-nitro-5-methoxy-p-phenylenediamine 5 parts of $N^1,N^4$-dimethyl-2-nitro-5-methoxy-p-phenylenediamine was admixed with 5 parts of isopropanol, 970 parts of water, 10 parts of monoethanolamine and 10 parts of methylcellulose. This mixture was dissolved by stirring at about 50° C., then permitted to cool to the ambient temperature of about 33° C. and finally poured over gray hair on the human head. The composition was permitted to remain on the hair for about 25 minutes, after which time, the hair was washed and thoroughly rinsed with water. The hair was dyed a bluish red color.

EXAMPLE 18

Dyeing hair with $N^1,N^4$-dimethyl-2-nitro-5-methyl-p-phenylenediamine 1 g. of $N^1,N^4$-dimethyl-2-nitro-5-methyl-p-phenylenediamine was dissolved in a mixture of 20 ml. isopropanol, about 200 ml. water, 2 gram monoethanolamine, 1 gram of triethanolamine, 1 gram polyacrylic acid and 1 gram glycerol at 50° C. This composition was heated to about 35° C.–37° C. and then applied to gray hair. After about 20 minutes, the hair was thoroughly rinsed and washed with soap and water. The hair was colored bluish red and the resulting shade was rubfast and not removable by washing with soap and water.

Although the invention has been described with reference to specific forms thereof, it will be understood that many changes and modifications may be made without departing from the spirit of this invention.

What is claimed is:

1. A process for N-monomethylating of nitroanilines containing a free primary amino group to replace one amine hydrogen of said amino group by a methyl group which comprises reacting said nitroanilines with a mixture containing formaldehyde or paraformaldehyde and sulfuric acid; the molar quantity of formaldehyde or paraformaldehyde employed being adequate to replace said amine hydrogen with a methyl group.

2. A process according to claim 1 wherein the reaction is carried out at a temperature in the range of about 40° C. to 120° C.

3. A process according to claim 2 wherein the reaction temperature is in the range of about 50° C. to 100° C.

4. A process according to claim 1 including the step of recovering the said resulting N-monomethylated nitroaniline product.

5. A process according to claim 1 wherein the nitroaniline is a nitro-p-phenylenediamine.

6. A process according to claim 5 wherein the nitro-p-phenylenediamine is of formula:

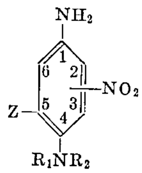

wherein:

$R_1$ is hydrogen or alkyl having from 1 to 6 carbon atoms;

$R_2$ is hydrogen or alkyl having 1 to 6 carbon atoms; acyl having 1 to 8 carbon atoms or carbalkoxy having 1 to 6 carbon atoms;

Z is hydrogen, alkoxy having 1 to 6 carbon atoms, halogen, or alkyl having 1 to 6 carbon atoms; the group —$NO_2$ being in the 2 or 3 position.

7. A process for N-monomethylating nitroanilines containing a free amino group to replace one amine hydrogen of said amino group by a methyl group which comprises reacting said nitroanilines with a mixture containing formaldehyde or paraformaldehyde and sulfuric acid; wherein the molar ratio of formaldehyde or paraformaldehyde to nitroaniline is in the range of from about 3 to 10 moles of formaldehyde or paraformaldehyde to 1 mole of the nitroaniline and the molar ratio of sulfuric acid to nitroaniline is in the range of about 5 to 20 moles of sulfuric acid to 1 mole of the nitroaniline.

8. Compounds of the formula:

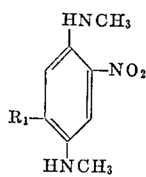

wherein:

$R_1$ is alkoxy having 1 to 6 carbon atoms, halogen or alkyl having 1 to 6 carbon atoms.

9. Compounds according to claim 8 wherein $R_1$ is methyl, methyl, methoxy, or chloro.

10. A compound of claim 8 wherein $R_1$ is methyl.

11. A compound of claim 8 wherein $R_1$ is methoxy.

12. A compound of claim 8 wherein $R_1$ is chloro.

References Cited

UNITED STATES PATENTS

| | | | |
|---|---|---|---|
| 2,687,431 | 8/1954 | Marschall | 260—577X |
| 3,274,249 | 8/1966 | Brunner et al. | 260—574X |

OTHER REFERENCES

Chemical Abstracts, "Imidazole Derivatives XXXVII, Synthesis of 5,6-quinones of Benziminoazole," vol. 64, No. 1, January 1966. 726f. Moore, "Methylation of Amines With Formaldethyde," Organic Reactions, vol. V., John Wiley & Sons, Inc.: New York, 1952, pp. 307–308.

CHARLES B. PARKER, Primary Examiner

C. F. WARREN, Assistant Examiner

U.S. Cl. X.R.

8—10, 10.1, 10.2, 11; 260—471, 562, 577; 424—330

UNITED STATES PATENT OFFICE

CERTIFICATE OF CORRECTION

Patent No. 3,591,638 Dated July 6, 1971

Inventor(s) Alexander Halasz

It is certified that error appears in the above-identified patent and that said Letters Patent are hereby corrected as shown below:

Column 11, lines 22 and 23, cancel "acyl having 1 to 8 carbon atoms or carbalkoxy having 1 to 6 carbon atoms". Column 12, line 13, cancel "methyl", first occurrence.

Signed and sealed this 23rd day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-33